United States Patent [19]
MacNeil et al.

[11] Patent Number: 5,575,842
[45] Date of Patent: Nov. 19, 1996

[54] METHOD OF DISPOSAL OF HAZARDOUS PARTICULATE SOLID WASTE BY ASPHALT EMULSION ENCAPSULATION

[76] Inventors: Angus MacNeil, 9180 Garden City Road, Richmond, British Columbia, Canada, V7A 2S1; Michael T. McDowell, 3720 Point Grey Road, Vancouver, British Columbia, Canada, V6R 1B2

[21] Appl. No.: 296,099

[22] Filed: Aug. 25, 1994

Related U.S. Application Data

[63] Continuation of Ser. No. 92,666, Jul. 14, 1993, abandoned, which is a continuation of Ser. No. 821,339, Jan. 13, 1992, abandoned, which is a continuation-in-part of Ser. No. 448,804, Dec. 11, 1989, abandoned.

[51] Int. Cl.[6] .................................. C09D 195/00
[52] U.S. Cl. ................ 106/273.1; 106/280; 588/252
[58] Field of Search .......................... 106/273.1, 272, 106/280; 588/252

[56] References Cited

U.S. PATENT DOCUMENTS

| | | |
|---|---|---|
| 4,059,666 | 11/1977 | Fowler. |
| 4,222,787 | 9/1980 | Jones. |
| 4,623,469 | 11/1985 | Conner ........................................ 106/76 |

FOREIGN PATENT DOCUMENTS

| | | |
|---|---|---|
| 50853 | 3/1990 | Hungary. |
| 125411 | 11/1976 | Japan. |
| 57-085853 | 5/1982 | Japan. |
| 60-180949 | 9/1985 | Japan. |
| 1170653 | 7/1989 | Japan. |
| 560246 | 3/1975 | Switzerland. |
| 573527 | 10/1977 | U.S.S.R.. |

OTHER PUBLICATIONS

United States Department of Energy No. FC/102291 "Determination of Hazardousness of Re–Use of Products using Low–Rank Western Coal Flyash/Bottomash" no date avail.

Amort, Karl, "Verwendung von Mullverbrennungsaschen als Zuschlagstoff zu Asphalt–Uberlegungen zu moglichen Aufbereitungsmassnahmen", No. 3 Bitumen, vol. 50. (1988) at pp. 119 to 124 no month avail.

Saracco, G. B. et al. "Disposal of Flyash" *Acquaria* No. 2, pp. 149–152. no date avail.

*Primary Examiner*—David Brunsman
*Attorney, Agent, or Firm*—Loeb & Loeb LLP

[57] ABSTRACT

The present invention provides a method of disposing of hazardous particulate waste containing hazardous waste by forming an asphalt emulsion slurry and using the slurry as a commercial asphalt emulsion slurry seal. The method comprises the steps of:

a) selecting an emulsifying agent suitable to form a stable emulsion of asphalt, water and said particulate waste;

b) mixing the particulate waste and asphaltic emulsion in proportions to form an asphaltic emulsion slurry having safe leaching properties;

c) utilizing said asphaltic emulsion slurry in existing commercial uses.

5 Claims, No Drawings

METHOD OF DISPOSAL OF HAZARDOUS PARTICULATE SOLID WASTE BY ASPHALT EMULSION ENCAPSULATION

This is a continuation of application Ser. No. 08/092,666 filed on Jul. 14, 1993, which is a continuation application of application serial No. 07/821,339, filed Jan. 13, 1992, which is a continuation-in-part application of application serial No. 07/448,804, filed Dec. 11, 1989, all now abandoned.

BACKGROUND OF THE INVENTION

This invention pertains to the field of solid waste materials and more particularly to a method of disposal of toxic particulate material by encapsulation in an asphalt emulsion.

Certain industrial processes, such as the combustion of waste solids, produce a fly ash which is environmentally hazardous due to the presence of toxic elements such as lead. Such fly ash cannot be disposed of in a standard landfill due to the leaching of the toxic material into the water table. Even where there is a material which renders the waste resistant to leaching, landfill sites are becoming scarce and expensive.

One method of disposing of waste fly ash which has been used in the past where the level of toxic elements in the fly ash has been sufficiently low has been the addition of the fly ash as a filler in asphalt concrete pavement or blacktop. This method of disposal is unsuitable for fly ash having high levels of toxic elements since some leaching of the toxic elements still occurs.

U. S. Pat. No. 4,623,469 issue Nov. 18, 1986 to Chem-Technics, Inc. discloses a method of disposing of hydrophillic liquid and semi-liquid waste by mixing the waste liquid and asphalt to generate a solid hydrophobic mass which can be disposed of in a landfill. According to this method, the ionic charge of the waste counter ions is determined and an emulsified asphaltic suspension having a particle charge opposite to the ionic charge of the waste counter ions is selected. Enough of the selected asphaltic emulsion is added to the waste liquid to coalesce into a solid hydrophobic mass. The mixture is allowed to set and cure to a solid state. This method, however, uses valuable landfill space, and the end product is not commercially useful.

An asphalt emulsion, or emulsified asphalt, is an emulsion of fine droplets of asphalt cement or bitumen in water. The emulsion is stabilized by the presence of an emulsifying agent, such as a detergent. Depending on the emulsifying agent used, such emulsions are either anionic, having negatively charged asphalt globules, or cationic, having positively charged asphalt globules. Such emulsions are commercially available for a number of uses. One such use is to form an asphalt emulsion slurry seal which is a mixture of emulsified asphalt, fine aggregate and mineral filler with water to produce a slurry. When dried by water evaporation, the slurry becomes a thick, jelly-like coating material which is applied wet much like a paint to coat pavement, driveways and the like.

For use as a coating for pavement, or for coating layers of garbage in garbage dumps, or similar applications, it is important that the asphalt coating be quick setting to minimize the period when the roadway is not in use, or the period before the next layer of garbage can be laid in the latter garbage dump application. In such quick-setting applications, the addition of substances such as cement which retard the setting of the asphalt emulsion is to be avoided.

There is therefore a need for a method of safely disposing of toxic particulate waste in a manner which is resistant to leaching yet does not require valuable landfill space and can be used commercially.

SUMMARY OF THE INVENTION

The present invention provides a method of disposing of hazardous particulate waste containing hazardous waste by forming an asphalt emulsion slurry and using the slurry as a commercial asphalt emulsion slurry seal. The method comprises the steps of:

a) selecting an emulsifying agent suitable to form a stable emulsion of asphalt, water and said particulate waste;

b) mixing the particulate waste and asphaltic emulsion in proportions to form an asphaltic emulsion slurry having safe leaching properties;

c) utilizing said asphaltic emulsion slurry in existing commercial uses.

DETAILED DESCRIPTION OF A PREFERRED EMBODIMENT

In the present invention, a suitable asphalt emulsion slurry is prepared using the fly ash as a constituent. In order to obtain a suitable slurry, the appropriate emulsifying agent must first be chosen so that the asphalt globules in the emulsion will encapsulate the fly ash particles. This can be done by making sample mixtures of the fly ash, asphalt and water and various of the commercially available emulsifying agents and visually determining which combination mixes properly. If the ionic charge of the waste fly ash material when added to the emulsion can be determined, then a suitable emulsifying agent with charge opposite to the waste ions is selected. Either anionic or cationic asphalt emulsions will be required depending on the nature of the particulate waste.

Having determined the appropriate emulsifying agent, sample mixtures of fly ash and asphalt emulsion are prepared covering a range of percentages of fly ash in the mixture for purposes of testing the degree of leaching, and in order to select those percentages which keep the leaching within an environmentally acceptable range. The desired result is achieved most effectively where there is complete encapsulation of the fly ash particles by the asphalt globules. Further, the relative proportions of asphalt emulsion and fly ash are chosen so that the mixture produces an asphalt emulsion slurry, rather than a solid mass.

The final asphalt emulsion slurry which is produced can be used commercially in the usual manner, as a slurry coat pavement or sealer, for example as a slurry coat pavement for roadways or commercial/industrial sites, or as a ground cover sealer. The weight:area ratio of these applications will typically be low to minimize the concentration of the hazardous waste, but will depend on the type and concentration of the toxic waste. In this way the hazardous fly ash is disposed of in a safe yet commercially useful way, and the need for landfill sites to store the waste is minimized.

EXAMPLE

A hazardous fly ash containing unsafe levels of lead was utilized. In particular, the fly ash was obtained from a bag house filtration air emission system and collection assembly for incinerated municipal waste. The fly ash contained lead in excess of the allowable leachate test limits as contained in the British Columbia Waste Management Act, "Leachate Extraction Procedures—Special Waste, Schedule 4", that is the leachate produced contained greater than 5 parts per million of lead. Various emulsifying agents were tested with fly ash, asphalt and water mixture to produce a suitable emulsion. In the case of this particular fly ash, REDI-KOTE E-5762 (trade-mark) manufactured by Armak Chemical Co. was found to produce a suitably stable emulsion. Various sample mixtures of asphalt emulsion and fly ash in proportions of 5%, 10%, 15%, 20% and 25% by weight were produced. A water leaching test as prescribed by the British Columbia Waste Management Act (Feb. 29, 1988) as prescribed in "Special Waste—Schedule 4" was carried out on the samples. The leachate from each sample was prepared and analyzed. The lead levels found in the leachate were found to be acceptable, for example 4.02 parts per million in the 15% sample and 3.39 parts per million in the 25% sample.

The various samples, with the exception of the 25% sample, were found to be of suitable composition for use as asphalt emulsion slurries. The 25% sample would not normally have been acceptable as a workable slurry for pavement coating or similar uses.

As will be apparent to those skilled in the art, various modifications and adaptations of the structure above described may be made without departing from the spirit of the invention, the scope of which is to be construed in accordance with the accompanying claims.

The embodiments of the invention in which an exclusive property or privilege is claimed are defined as follows:

1. A method of disposing of hazardous particulate waste containing hazardous waste ions comprising the steps of:
    (a) determining the ionic charge of said waste ions;
    (b) selecting an asphaltic emulsion suitable for forming a stable mixture with said particulate waste;
    (c) mixing said particulate waste and said asphaltic emulsion to form a quick setting asphaltic emulsion slurry sealer consisting essentially of said asphaltic emulsion, water and said waste; and,
    (d) utilizing said asphaltic emulsion slurry sealer as a coating on pavement in existing commercial uses where a quick setting asphaltic emulsion slurry sealer is useful.

2. The method of claim 1 in which said particulate waste is fly ash.

3. The method of claim 1 in which said existing commercial use is the coating of pavement.

4. The method of claim 1 wherein said asphaltic emulsion slurry is formed without the addition of cement.

5. The method of claim 1 wherein said particulate waste comprises less than 25% by weight of said asphaltic emulsion slurry.

* * * * *